United States Patent Office 3,358,056
Patented Dec. 12, 1967

3,358,056
POLYMERIZATION PROCESS
Samuel Renaudo, Bartlesville, Okla., assignor to Phillips Petroleum Company, a corporation of Delaware
No Drawing. Filed June 1, 1964, Ser. No. 371,787
9 Claims. (Cl. 260—878)

ABSTRACT OF THE DISCLOSURE

A block copolymer of ethylene and propylene is produced by a two step process. In one step the slower reacting monomer, propylene, is polymerized at a relatively high temperature in the presence of liquid propylene as the sole diluent so as to produce a propylene block at commercially acceptable rates. In the other step ethylene is polymerized at a relatively low temperature, again in the presence of liquid propylene as the sole diluent. Because of this low temperature the block produced in this step is compared predominately of ethylene. These steps may be carried out in any order—that is the high temperature polymerization of the propylene may be either first or second.

---

This invention relates to a combination polymerization process for the polymerization of propylene and ethylene.

It is known to prepare an ethylene-propylene block copolymer having high crystallinity, impact strength, modlus, and tensile and low brittleness temperature by polymerizing one monomer, removing any unpolymerized material suspending the polymer in a hydrocarbon solvent such as n-heptane; and polymerizing a second monomer block onto the first polymer block.

An object of this invention is to provide new polymer products. A further object of this invention is to provide methods of preparing these products. A further object of this invention is to provide a new polymerization process in which propylene is polymerized in liquid propylene as the diluent followed by the polymerization of ethylene in the presence of the polypropylene initially formed and liquid propylene as the diluent under conditions such that a high ethylene content copolymer block is formed. A further object is to provide a polymerization process in which a mixture of ethylene and propylene is polymerized under conditions such that a high ethylene content polymer is produced, unpolymerized ethylene is removed and additional propylene polymerized in the presence of the first polymer to provide a polypropylene block thereon. Other objects and advantages of this invention will be apparent to those skilled in the art upon reading this disclosure.

My invention constitutes an improvement over the combination process described above because no extraneous diluents are required. By proper temperature selection it is possible to carry out both steps of the polymerization using liquid propylene as the reaction medium while still obtaining good reaction rates. The use of a comparatively low temperature for the polymerization of the ethylene in the presence of liquid propylene is necessary for a high ethylene content. Generally, I prefer to carry out this step of the polymerization at −50 to 75° F. Especially good results are obtained below 10° F. Higher temperatures, as high as generally 80 to 150° F., are used for the homopolymerization of the propylene.

Broadly, then, my invention resides in a polymerization process comprising polymerizing ethylene in the presence of liquid propylene in the absence of additional liquid diluent using a catalyst active for such polymerization under conditions such that a predominantly ethylene polymer is formed. In a further aspect, the invention resides in a two-step polymerization process comprising a step in which propylene as the sole monomer is polymerized in the presence of liquid propylene in the absence of additional liquid diluent and a step in which ethylene is polymerized in the presence of liquid propylene in the absence of additional liquid diluent, the step which is carried out second being performed in the presence of the polymer produced in the first, using a catalyst active for the polymerization. In a further aspect, it comprises a polymerization process comprising polymerizing propylene in liquid propylene as a reaction medium in the presence of a catalyst active for such polymerization at a temperature in the range of 80 to 150° F., adding ethylene and continuing polymerization at a temperature below 10° F. Yet another aspect comprises a polymerization process comprising polymerizing ethylene in the presence of liquid propylene in the absence of additional liquid diluent using a catalyst active for such polymerization, removing unpolymerized ethylene from the reaction mixture, and polymerizing at least a portion of the remaining propylene in the presence of the polymer produced in the first step.

Since a wide variety of catalyst systems can be employed in the polymerization, it is not intended to limit the invention to any particular catalyst system. Catalyst systems suitable for use in the polymerization are those which are capable of polymerizing a mono-1-olefin in a mass polymerization system and under conditions such that solid polymer in particle form is produced. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Group IV–A, IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$
$(C_4H_9)_2AlBr$, $C_8H_{17}AlI_2$ $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), 3-methylcyclohexylaluminum dichloride, 2-cyclohexylethylgallium dichloride, p-tolylberyllium iodide, di-(3-phenyl-1-methylpropyl) indium fluoride, 2-(3-isopropylcyclohexyl)ethylthallium dibromide, and the like. Mixtures of these materials, such as a mixture of diethylaluminum chloride and ethylaluminum dichloride, etc., can also be employed.

The metal halide component of the catalyst system is preferably a halide of a Group IV–A or IV–B metal, i.e., titanium, zirconium, hafnium and germanium. The trichlorides, trifluorides, tribromides, and triiodides, as well as the tetrachloride, tetrafluorides, tetrabromides and traiodides of the Group IV-A or IV-B metals, can be used in the catalyst system, either individually or as mixtures of two or more of the metal halides. It is usually preferred to employ a trichloride, such as titanium trichloride, in the polymerization. However, it is to be understood that halides of metals of the other groups specified above, such as vanadium, molybdenum, tungsten, cobalt, and iron can also be employed in the catalyst system.

The preferred catalyst system employed in the polymerization comprises a dialkylaluminum chloride, such as diethylaluminum chloride, and titanium trichloride, the latter compound preferably being prepared by reduction of titanium tetrachloride in the presence of aluminum. The reduction product is preferably a complex having the approximate formula $3TiCl_3 \cdot AlCl_3$. The reduction reaction is usually carried out at an elevated temperature, for example, at a temperature in the range of 360 to 600° F., preferably from 375 to 450° F.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols/mol. When employing the preferred catalyst system, the mol ratio of the dialkylaluminum halide to the titanium trichloride complex usually ranges from 1.0:0.02 to 1.0:50.0, preferably 1.0:0.1 to 1.0:10.0. The amount of dialkylaluminum halide used is at least $1.0 \times 10^{-4}$ gm./gm. of monomer and can be as much as $25 \times 10^{-4}$ gm./gm. of monomer. The amount of titanium trichloride employed is generally in the range of $1.5 \times 10^{-4}$ to $10 \times 10^{-4}$ gm./gm. of monomer.

Although not essential to the conduct of the polymerization, it is often desirable to carry out the polymerization in the presence of elemental hydrogen. When so operating, hydrogen is added in an amount sufficient to provide from 0.03 to 1.0 mol percent hydrogen in the liquid mono-1-olefin phase in the polymerization zone.

Although pressures ranging from atmospheric up to 5000 p.s.i.g. can be used, a pressure in the range of 100 to 1000 p.s.i.g. is ordinarily preferred. In general, the pressure used in the process is sufficient to maintain the reaction mixture substantially in the liquid phase.

The lower temperature used when ethylene is polymerized in the second step of the polymerization can be obtained by external heat exchange or by auto refrigeration, i.e., by flashing propylene from the first reaction mixture. A combination of these cooling methods can be used.

The proportion of the polypropylene and polyethylene portions of the product can be varied widely. Generally, the predominantly polyethylene portion constitutes 10 to 50, preferably 15 to 25, percent by weight of the final product.

Several reactors can be used in either or both stages.

Although the ethylene can be added to reaction zone, in either liquid or gas phase, it is preferable in some instances to add to it in liquid phase.

Infrared spectra of the resin of this invention indicate that the copolymer phase contains methylene sequences of at least 5 or more units. There are two bands present at 13.70 and 13.88 microns, the former being a shoulder on the latter. The 13.70 micron band disappears when the sample is melted indicating that a crystalline polyethylene structure is present.

Examples of the best mode of operating according to my invention are set forth below. The examples are illustrative and should not be considered unduly limiting.

*Example I*

Two runs were made in which propylene was polymerized in liquid phase in a 1-gallon reactor for 2 hours at 120° F. in the presence of 44 p.p.m. hydrogen. In the first, the catalyst was obtained by mixing 0.59 grams of diethylaluminum chloride and 0.517 gram of $3TiCl_3 \cdot AlCl_3$ complex. The propylene was flashed off and one liter of liquid propylene and one pound (about one-half liter) of ethylene were added. The reaction was continued for 1 hour at 50° F. Approximately 292 grams of propylene polymerized in the first step and the final polymer weighed about 374 grams.

Run 2 was made following the same procedure with two changes. The amount of $3TiCl_3 \cdot AlCl_3$ complex was 0.494 gram. The second step, ethylene polymerization, was carried out for 3 hours at 0° F. Approximately 257 grams of propylene polymerized in the first step and the final product weighed about 321 grams.

| Run No. | Melt Index [1] | Brittleness Temp., ° F. [2] | Flexural Modulus, p.s.i. [3] | Density g./cc. [4] | Tensile p.s.i. [5] |
|---|---|---|---|---|---|
| 1 | 0.07 | −51 | 98,000 | 0.9026 | 2693 |
| 2 | 0.10 | −48 | 148,000 | 0.9109 | 3493 |

[1] ASTM D1238-57T (230° F., 2160 g.).
[2] ASTM D746-57T.
[3] ASTM D790-61.
[4] ASTM D1505-60T.
[5] ASTM D636-61T.

This run shows the advantage of the lower temperature, below 10° F., in the second step. When so operating a polymer is made having about the same melt index and brittleness temperature, but having a 51 percent higher flexural modulus, a considerably higher crystallinity as indicated by the higher density, and a 30 percent higher tensile strength. In both polymers copolymer incorporation is about 20 percent. The copolymer contains long ethylene blocks with a small amount of propylene incorporated therein.

*Example II*

A series of runs were made to determine the amount of ethylene which will dissolve in propylene at various pressures and temperatures. The results at approximately 60° F. are pertinent in the data reported hereinafter. In each case liquid propylene was charged to an autoclave and ethylene pressured in. The mixture was agitated and, after momentarily stopping the agitation, a portion of the liquid was analyzed by mass spectrograph for mol percent ethylene.

| Run | Temp., ° F. | Total Pressure, p.s.i.g. | Mol Percent $C_2H_4$ in Liquid |
|---|---|---|---|
| 1 | 60.0 | 115 | 00.0 |
| 2 | 60.3 | 167 | 11.0 |
| 3 | 60.0 | 222 | 23.6 |
| 4 | 60.5 | 278 | 34.5 |

These data provide the basis on which the "mol percent $C_2H_4$" figures are based in this and the following example.

Another preliminary series of runs was made to determine the rate of copolymer polymerization with varying amounts of ethylene in liquid propylene. All of these runs were made at 60° F. with no hydrogen present. The initiator components, diethylaluminum (DEAC) and aluminum activated titanium trichloride (AA $TiCl_3$) having the approximate formula $3TiCl_3 \cdot AlCl_3$ were first added to the autoclave (3.82 liter capacity) followed by liquid propylene under its own vapor pressure. Ethylene was pressured in until the desired concentration was obtained in the liquid phase. The reaction was allowed to proceed for a specified period of time while maintaining a constant pressure on the system by continuous ethylene addition. The following results were obtained.

| Run | AA TiCl₃, g. | DEAC, g. | Mol Percent C₂H₄ | Time, hrs. | Rate, g./g. AA TiCl₃ per hr. |
|---|---|---|---|---|---|
| 1 | 0.5084 | 0.59 | 0 | 2.0 | |
| 2 | 0.5045 | 0.59 | 11.5 | 2.0 | 75 |
| 3 | 0.5037 | 0.59 | 21.5 | 2.0 | 131 |
| 4 | 0.4988 | 0.59 | 31.5 | 2.0 | 152 |
| 5 | 0.5000 | 0.59 | 40.5 | 2.0 | 158 |
| 6 | 0.5234 | 0.59 | 21.5 | 1.0 | 118 |
| 7 | 0.5437 | 0.59 | 21.5 | 4.0 | 108 |

Data from these control runs were plotted and the plot used in determining the amount of copolymer in the following runs in which ethylene was polymerized in the presence of proylene followed by polymerization of propylene in the presence of liquid propylene.

In the following runs the ethylene was polymerized in the first stage, this corresponding to the above procedure. At the end of the desired ethylene polymerization, unreacted material (ethylene and propylene) was vented. For the second stage, based on 3.82 liter reaction volume, 0.08 gram mol of hydrogen was added in Runs 1–12 and 0.04 gram mol in Runs 13–15. The mixture was heated to 130° F. and propylene added until the reactor was liquid full. Propylene was added to maintain the reactor liquid full during the reaction, the time being varied according to the ratio of copolymer to homopolymer desired in the final product.

At the end of the run methanol was introduced to stop further reaction. Remaining liquid was flashed and the product weighted. Extraction with propylene produced an insoluble fraction upon which physical properties were determined. The following table summarizes these runs and shows the properties.

The preceding table illustrates the effect of ethylene concentration during the copolymerization stage and the effect of copolymer concentration in the final product in these resins. Low ethylene concentration in the reactor slurry and high copolymer concentration in the total polymer both favored low brittleness temperature. Runs 13–1 show the effect of ethylene concentration upon reaction rates in the first stage. An increase in ethylene concentration from 1.5 to 40.5 percent decreased the reaction time required to produce 17–19 weight percent copolymer from 5.6 to 0.87 hours. In these runs brittleness temperature remained fairly constant but flexural modulus increased as ethylene concentration increased. While all of these resins would be good for particular application, the data indicate that the best products have a copolymer content in the range of 10 to 25 percent—low brittleness temperature and high impact strength.

*Example III*

Except when differences are noted, the procedure of Example II was followed in a series of runs in which reaction temperature and hydrogen concentration (in the propylene homopolymerization) were varied. Using a 17.8 liter autoclave and an initiator formed by mixing 2 grams of aluminum activated TiCl₃ and 2.39 grams of diethyl aluminum chloride, ethylene was polymerized in the presence of propylene. The ethylene concentration was 21.5 mol percent in the liquid phase. The ethylene polymerization was done at 60° F. for 1.16 hours, the rate being 162 g./g. AA TiCl₃/hr. Hydrogen addition is based

| Run No. | AA TiCl₃, grams | DEAC, grams | Stage 1 | | | Stage 2 | | Total Polymer | | | Properties of C₃H₆ Insoluble Polymer | | | | |
|---|---|---|---|---|---|---|---|---|---|---|---|---|---|---|---|
| | | | Mol percent C₂H₄ | Time, hrs. | Rate, g./g. AA TiCl₃/hr. | Time, hrs. | Rate, g./g. AA TiCl₃/hr. | Productivity, g./g. AA TiCl₃ | Copolymer Content, Wt. percent | C₃H₆ Soluble, percent | Flexural Modulus, p.s.i. ×10⁻³ | Tensile Strength, p.s.i. | Brittleness Temp., °F. | Impact Unnotched at 0° F., ft. lbs./in.[1] |
| 1 | 0.2480 | 0.37 | 11.5 | 0.67 | 75 | 2.0 | 461 | 972 | 5.2 | 3.5 | 202 | 3,997 | +63 | 3.74 |
| 2 | 0.5160 | 0.59 | 11.5 | 0.67 | 75 | 1.0 | 605 | 655 | 7.7 | 3.1 | 164 | 2,940 | +25 | 5.26 |
| 3 | 0.5056 | 0.59 | 11.5 | 1.33 | 75 | 1.0 | 658 | 758 | 13 | 2.5 | 144 | 2,900 | −20 | 13.58 |
| 4 | 0.2557 | 0.37 | 11.5 | 2.67 | 75 | 1.0 | 637 | 837 | 24 | 2.3 | 88 | 4,390 | −55 | (²) |
| 5 | 0.2663 | 0.37 | 21.5 | 0.33 | 131 | 2.0 | 467 | 976 | 4.4 | 6.5 | 224 | 4,410 | +65 | 2.90 |
| 6 | 0.5043 | 0.59 | 21.5 | 0.33 | 131 | 1.0 | 590 | 633 | 6.8 | 4.2 | 230 | 4,593 | +60 | 3.18 |
| 7 | 0.5160 | 0.59 | 21.5 | 0.67 | 131 | 1.0 | 603 | 690 | 13 | 3.5 | 202 | 3,837 | +22 | 8.74 |
| 8 | 0.5103 | 0.59 | 21.5 | 1.33 | 131 | 1.0 | 595 | 770 | 23 | 3.4 | 146 | 3,120 | −30 | 21.43 |
| 9 | 0.2660 | 0.37 | 40.5 | 0.33 | 158 | 2.0 | 416 | 885 | 5.9 | 6.5 | 224 | 4,500 | +73 | 2.48 |
| 10 | 0.4990 | 0.37 | 40.5 | 0.33 | 158 | 1.0 | 521 | 573 | 9.1 | 4.6 | 231 | 4,360 | +54 | 2.63 |
| 11 | 0.5072 | 0.59 | 40.5 | 0.67 | 158 | 1.0 | 513 | 619 | 17 | 4.3 | 199 | 3,670 | +6 | 5.68 |
| 12 | 0.5025 | 0.59 | 40.5 | 1.33 | 158 | 1.0 | 463 | 673 | 31 | 5.3 | 150 | 3,210 | −30 | 21.26 |
| 13 | 0.5035 | 0.59 | 1.5 | 5.6 | 25 | 0.92 | 672 | 755 | 18 | 2.8 | 94 | 2,470 | −23 | 23.72 |
| 14 | 0.5004 | 0.59 | 11.5 | 1.9 | 75 | 1.25 | 557 | 839 | 17 | 1.9 | 117 | 2,450 | −29 | 27.67 |
| 15 | 0.5008 | 0.59 | 40.5 | 0.87 | 158 | 1.25 | 480 | 745 | 19 | 3.6 | 142 | 3,507 | −22 | 24.36 |

[1] ASTM D256-56.  [2] No break.

on reaction volume and given in gram mols. The data are:

| Run No. | Stage 2 | | | | Total Polymer | | | Properties of C³H⁶ Insoluble Polymer | | | |
|---|---|---|---|---|---|---|---|---|---|---|---|
| | Temp., °F. | H₂ Moles Added | Time, Hours | Rate, g./g. AA TiCl₃/hr. | Productivity, g./g. AA TiCl₃ | Copolymer Content, percent | C₃H₆ Soluble, percent | Flexural Modulus p.s.i.×10⁻³ | Tensile Strength, p.s.i. | Brittleness Temp., °F. | Impact, Unnotched at 0° F., ft. lbs./in. |
| 1 | 110 | 0.25 | 3.17 | 226 | 906 | 21 | 3.2 | 141 | 2,833 | −31 | 17.56 |
| 2 | 110 | 0.50 | 3.50 | 220 | 960 | 20 | 4.0 | 172 | 3,047 | −24 | 12.64 |
| 3 | 110 | 1.00 | 3.33 | 234 | 968 | 19 | 5.3 | 192 | 2,607 | +30 | 3.90 |
| 4 | 130 | 0.25 | 1.5 | 505 | 945 | 20 | 3.7 | 134 | 2,633 | −50 | 24.79 |
| 5 | 130 | 0.50 | 1.5 | 506 | 1,098 | 17 | 3.8 | 163 | 3,000 | −20 | 10.83 |
| 6 | 130 | 1.00 | 1.5 | 584 | 1,064 | 18 | 4.5 | 184 | 2,763 | +41 | 4.39 |
| 7 | 150 | 0.25 | 0.88 | 883 | 965 | 20 | 4.8 | 125 | 2,627 | −50 | 25.64 |
| 8 | 150 | 0.50 | 0.88 | 985 | 1,055 | 18 | 4.8 | 151 | 2,870 | −13 | 10.11 |
| 9 | 150 | 1.00 | 0.88 | 1,009 | 1,076 | 18 | 7.1 | 186 | 2,973 | 0 | 4.55 |

The data show that brittleness temperature and modulus decrease with increase in hydrogen concentration. Brittleness temperature was not greatly affected by an increase in reaction temperature but modulus decreased in most cases.

*Example IV*

Another series of runs included homopolymerization of propylene followed by the production of the predominantly ethylene copolymer. Following the initial propylene polymerization stage (130° F. for 2 hours; 2 grams aluminum activated $TiCl_3$; 2.39 grams dialkylaluminum chloride), the reaction mixture was rapidly cooled by flashing propylene from the reactor and by external cooling to 60° F. Ethylene was added until the pressure indicated the desired quantity in the propylene. Its flow was regulated at this pressure to provide addition as demanded by the reaction, the time being governed by the desired ratio of copolymer to homopolymer in the product. A soluble fraction of the product was removed by washing with an ethylene-propylene mixture. The effect of copolymer content is shown in the following table wherein the copolymerization was carried out with 4.5 mol percent ethylene in the liquid propylene.

4. A polymerization process comprising polymerizing propylene in liquid propylene as a reaction medium in the presence of a catalyst formed by mixing material comprising (a) a compound having the formula $R_nMX_m$, wherein R is selected from the group consisting of alkyl, cycloalkyl and aryl radicals, X is selected from the group consisting of hydrogen and a halogen, M is selected from the group consisting of aluminum, gallium, indium and thallium, n is from 1 to 3, inclusive, m is from 0 to 2, inclusive, and the sum of m and n is equal to the valence of the metal M, and (b) a halide of a metal selected from the group consisting of metals of Groups IV–A, IV–B, V–B, VI–B, and VIII, at a temperature in the range of 80 to 150° F., adding ethylene and continuing polymerization in the presence of liquid propylene at a temperature below 10° F.

5. The process of claim 4 wherein a portion of the liquid propylene reaction medium is removed prior to the addition of the ethylene.

6. A polymerization process comprising polymerizing propylene in liquid propylene as a reaction medium in the presence of a catalyst which forms on mixing diethylaluminum chloride and $3TiCl_3 \cdot AlCl_3$ at 120° F. for 2

| Run No. | Stage 1 | | Stage 2 | | Total Polymer | | | Properties of $C_2H_4$–$C_3H_6$ Insoluble Polymer | | | |
|---|---|---|---|---|---|---|---|---|---|---|---|
| | $H_2$ Moles Added | Rate, g./g. AA $TiCl_3$/hr. | Time, hrs. | Rate, g./g. AA $TiCl_3$/hr. | Productivity g./g. AA $TiCl_3$ | Copolymer Content, Percent | $C_2H_4$–$C_3H_6$ Soluble, Percent | Flexural Modulus, p.s.i.×10⁻³ | Tensile Strength, p.s.i. | Brittleness Temp., °F. | Impact Unnotched at 0° F., ft. lbs./in. |
| 1 | 0.10 | 332 | Control | | 664 | 0 | 0 | 181 | 3,760 | +50 | 2 |
| 2 | 0.10 | 332 | 0.67 | 80 | 717 | 7.4 | 4.6 | 184 | 3,567 | +12 | 7.52 |
| 3 | 0.10 | 332 | 2.0 | 92 | 848 | 21.7 | 4.0 | 101 | 2,368 | −55 | (¹) |
| 4 | 0.10 | 332 | 4.0 | 96 | 1,059 | 37.4 | 3.5 | 48 | 4,365 | −72 | (¹) |
| 5 | 0.22 | 355 | Control | | 710 | 0 | 0 | 216 | 4,000 | +80 | 2 |
| 6 | 0.22 | 355 | 1.0 | 87 | 797 | 10.5 | 5.1 | 166 | 3,313 | −28 | 10.29 |
| 7 | 0.22 | 355 | 2.0 | 95 | 900 | 20.8 | 4.9 | 124 | 2,533 | −47 | 30.54 |
| 8 | 0.22 | 355 | 3.0 | 92 | 985 | 27.6 | 4.7 | 96 | 4,400 | −57 | (¹) |
| 9 | 0.30 | 364 | Control | | 727 | 0 | 0 | 220 | 4,160 | +100 | 2 |
| 10 | 0.30 | 364 | 1.0 | 73 | 800 | 9.1 | 5.5 | 214 | 3,833 | +26 | 6.37 |
| 11 | 0.30 | 364 | 2.0 | 88 | 902 | 19.4 | 5.2 | 130 | 2,600 | −32 | 22.48 |
| 12 | 0.30 | 364 | 3.0 | 84 | 980 | 25.8 | 4.4 | 119 | 4,733 | −47 | 26.44 |

¹ No break.

As many possible embodiments can be made of this invention without departing from the scope thereof, it is to be understood that all matter herein set forth is to be interpreted as illustrative and not as unduly limiting the invention.

I claim:

1. A two-step polymerization process comprising a step in which propylene as the sole monomer is polymerized in the presence of liquid propylene in the absence of additional liquid diluent at a temperature within the range of 80 to 150° F. and a step in which ethylene is polymerized in the presence of liquid propylene in the absence of additional liquid diluent at a temperature within the range of −50 to 75° F., the step which is carried out second being performed in the presence of the polymer produced in the first, using a catalyst formed by mixing materials comprising (a) a compound having the formula $R_nMX_m$, wherein R is selected from the group consisting of alkyl, cycloalkyl and aryl radicals, X is selected from the group consisting of hydrogen and a halogen, M is selected from the group consisting of aluminum, gallium, indium and thallium, n is from 1 to 3, inclusive, m is from 0 to 2, inclusive, and the sum of m and n is equal to the valence of the metal M, and (b) a halide of a metal selected from the group consisting of metals of Groups IV–A, IV–B, V–B, VI–B, and VIII.

2. The process of claim 1 wherein hydrogen is present during at least one of said polymerization steps.

3. The process of claim 1 wherein hydrogen is present during the step in which propylene is the sole monomer present.

hours, cooling the resulting mixture of polypropylene and liquid propylene to 0° F., adding ethylene, and continuing polymerization in the presence of said liquid propylene for an additional 3 hours.

7. A polymerization process comprising polymerizing ethylene in the presence of liquid propylene in the absence of additional liquid diluent at a temperature within the range of −50 to 75° F., using a catalyst formed by mixing materials comprising (a) a compound having the formula $R_nMX_m$, wherein R is selected from the group consisting of alkyl, cycloalkyl and aryl radicals, X is selected from the group consisting of hydrogen and a halogen, M is selected from the group consisting of aluminum, gallium, indium and thallium, n is from 1 to 3, inclusive, m is from 0 to 2, inclusive, and the sum of m and n is equal to the valence of the metal M, and (b) a halide of a metal selected from the group consisting of metal of Groups IV–A, IV–B, V–B, VI–B and VIII removing unpolymerized ethylene from the reaction mixture, and polymerizing in the presence of liquid propylene at least a portion of the remaining propylene at a temperature within the range of 80 to 150° F. in the presence of the polymer produced in the first step.

8. The process of claim 7 wherein additional propylene is added to the reaction mixture following the removal of ethylene therefrom.

9. A polymerization process comprising preparing a polymer from a mixture of ethylene and propylene, said mixture containing approximately 1.5 to 40.5 mol percent of ethylene based on the mols of propylene at a temperature within the range of −50 to 75° F., in the presence of a catalyst obtained by mixing $3TiCl_3 \cdot AlCl_3$ and diethylaluminum chloride, flashing ethylene from the reaction mixture, adding additional propylene and continuing polymerization at a temperature within the range of 80 to 150° F., and recovering a final polymerization product, said final product containing approximately 15 to 25 percent by weight of the polymerization product produced in the first step, both of said polymerizations being carried out in the presence of liquid propylene.

References Cited

FOREIGN PATENTS

| 989,261 | 6/1962 | Great Britain. |
| 915,622 | 1/1963 | Great Britain. |
| 1,220,947 | 1/1960 | France. |

JOSEPH L. SCHOFER, *Primary Examiner.*

M. B. KURTZMAN, F. L. DENSON,
*Assistant Examiners.*